US012705517B1

(12) United States Patent
Haener et al.

(10) Patent No.: US 12,705,517 B1
(45) Date of Patent: Aug. 11, 2026

(54) SPARSE SIMULATION OF CLIFFORD-DOMINATED QUANTUM CIRCUITS

(71) Applicant: Amazon Technologies, Inc., Seattle, WA (US)

(72) Inventors: Thomas Haener, Zug (CH); Helmut Gottfried Katzgraber, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 909 days.

(21) Appl. No.: 18/066,876

(22) Filed: Dec. 15, 2022

(51) Int. Cl.
*G06N 10/20* (2022.01)

(52) U.S. Cl.
CPC .................................... *G06N 10/20* (2022.01)

(58) Field of Classification Search
CPC ...................................................... G06N 10/20
See application file for complete search history.

(56) References Cited

U.S. PATENT DOCUMENTS

2021/0158425 A1 5/2021 Kasprowicz et al.
2021/0194487 A1* 6/2021 Liu ........................ G06N 10/20
2021/0272000 A1* 9/2021 van den Berg ..... G06F 9/30029
2021/0406755 A1* 12/2021 Martiel ................ H03K 19/195

OTHER PUBLICATIONS

NPL Lee Classical Simulation of Quantum Stabilizer and Clifford Circuits May 2022.*
NPL Gilliam Foundational Patterns for Efficient Quantum Computing 2021.*
NPL Aaronson Improved Simulation of Stabilizer Circuits 2008.*
NPL Bunandar Numerical finite key analysis of quantum key distribution 2020.*
NPL DeWolf Quantum Computing and Communication Complexity 2001.*
NPL Nagarajan QuantumCircuitOpt 2021.*
NPL Bagherimehrab Nearly Optimal Quantum Algorithm Jun. 2022.*
NPL Grier the Classification of Clifford Gates Jun. 2022.*
NPL Mitchell Explore the Clifford Group 2021.*
Richard P Feynman. "Simulating physics with computers", 1981. International Journal of Theoretical Physics, 21(6/7), 1981, pp. 467-488.
Peter W Shor. "Algorithms for quantum computation: discrete logarithms and factoring". In Proceedings 35th annual symposium on foundations of computer science, pp. 124-134. Ieee, 1994.

(Continued)

*Primary Examiner* — Paul M Knight
(74) *Attorney, Agent, or Firm* — Alexander A. Knapp; Kowert, Hood, Munyon, Rankin & Goetzel, P.C.

(57) ABSTRACT

A quantum computing service includes a quantum simulator using classical hardware configured to perform a sparse simulation of a Clifford dominated quantum circuit that includes at least some non-Clifford gates. The non-Clifford gates are represented using a Clifford portion and a non-Clifford portion, wherein application of the Clifford portion of the non-Clifford gates includes updating a Clifford tableau for the quantum circuit being simulated and application of the non-Clifford portion of the non-Clifford gates includes applying a rotational term that is at most 2-sparse to a set of key-value pairs representing a sparse state of the quantum circuit being simulated.

20 Claims, 8 Drawing Sheets

(56) References Cited

OTHER PUBLICATIONS

Alberto Peruzzo, Jarrod McClean, Peter Shadbolt, Man-Hong Yung, Xiao-Qi Zhou, Peter J Love, Alan Aspuru-Guzik, and Jeremy L O'brien. "A variational eigenvalue solver on a photonic quantum processor". Nature communications, 5 (1): pp. 1-7, 2014.
Edward Farhi, Je rey Goldstone, and Sam Gutmann. "A quantum approximate optimization algorithm". arXiv preprint arXiv:1411.4028, 2014, pp. 1-16.
Sergey Bravyi and David Gosset. "Improved Classical Simulation of Quantum Circuits Dominated by Clifford Gates". Physical review letters, 116(25):250501, 2016 American Physical Society, pp. 1-5.
Scott Aaronson and Daniel Gottesman. "Improved simulation of stabilizer circuits". Physical Review A, 70(5):052328, 2004, pp. 1-15.
Igor L Markov and Yaoyun Shi. "Simulating quantum computation by contracting tensor networks". SIAM Joumal on Computing, 38(3):pp. 963-981, 2008.
Igor L Markov, Aneeqa Fatima, Sergei V Isakov, and Sergio Boixo. "Quantum supremacy is both closer and farther than it appears". arXiv preprint arXiv:1807.10749, 2018, pp. 1-32.
Thomas ★ aner and Damian S. Steiger. "0.5 petabyte simulation of a 45-qubit quantum circuit". In Proceedings of the International Conference for High Performance Computing, Networking, Storage and Analysis, SC '17, New York, NY, USA, 2017. Association for Computing Machinery. Retrieved from arXiv preprint: arXiv:1704.01127 [quant-ph], pp. 1-10 (2017).
Sergey Bravyi, Dan Browne, Padraic Calpin, Earl Campbell, David Gosset, and Mark Howard. "Simulation of quantum circuits by low-rank stabilizer decompositions". Quantum, 3:181, 2019, arXiv:1808.00128v2, pp. 1-48.
Hammam Qassim, Hakop Pashayan, and David Gosset. "Improved upper bounds on the stabilizer rank of magic states". Quantum, 5:606, 2021,arXiv:2106.07740v2, pp. 1-12.
Aleks Kissinger and John van de Wetering. "Simulating quantum circuits with zx-calculus reduced stabiliser decompositions". Quantum Science and Technology, 2022, retrieved from arXiv preprint: arXiv:2109.01076 [quant-ph], 2021, pp. 1-19.
Samuel Jaques and Thomas Haner. "Leveraging State Sparsity for More Efficient Quantum Simulations". ACM Transactions on Quantum Computing, 3(3):pp. 1-17, 2022, retrieved from arXiv preprints: arXiv:2105.01533 [quant-ph], 2-21, pp. 1-16.
Daniel Gottesman. "Theory of fault-tolerant quantum computation". Physical Review A, 57(1): pp. 127-137, 1998.
Craig Gidney. "Stim: a fast stabilizer circuit simulator". Quantum, 5:497, 2021, retrieved from arXiv prerpint: arXiv:2103.02202v3, pp. 1-26.
Martin Rotteler. "Quantum algorithms for highly non-linear Boolean functions". In Proceedings of the twenty-first annual ACM-SIAM symposium on Discrete algorithms, pp. 448{457. SIAM, 2010, retrieved from arXiv preprint: arXiv:0811.3208 [quant-ph], pp. 1-15.
Malte Skarupke. "flat hash map". https://github.com/skarupke/flat_hash_map. Initially Accessed: Sep. 19, 2022, recently retrieved on Jan. 3, 2023, p. 1.
Andrew W Cross, Lev S Bishop, John A Smolin, and Jay M Gambetta. "Open quantum assembly language". arXiv preprint arXiv:1707.03429, 2017, pp. 1-24.
Wenzel Jakob, Jason Rhinelander, and Dean Moldovan, pybind11{seamless operability between c++ 11 and python. URL: https://github.com/pybind/pybind11, 2017, pp. 1-5.
U.S. Appl. No. 16/909,938, filed Jun. 23, 2020, Dylan Thomas Shields, et al.

* cited by examiner

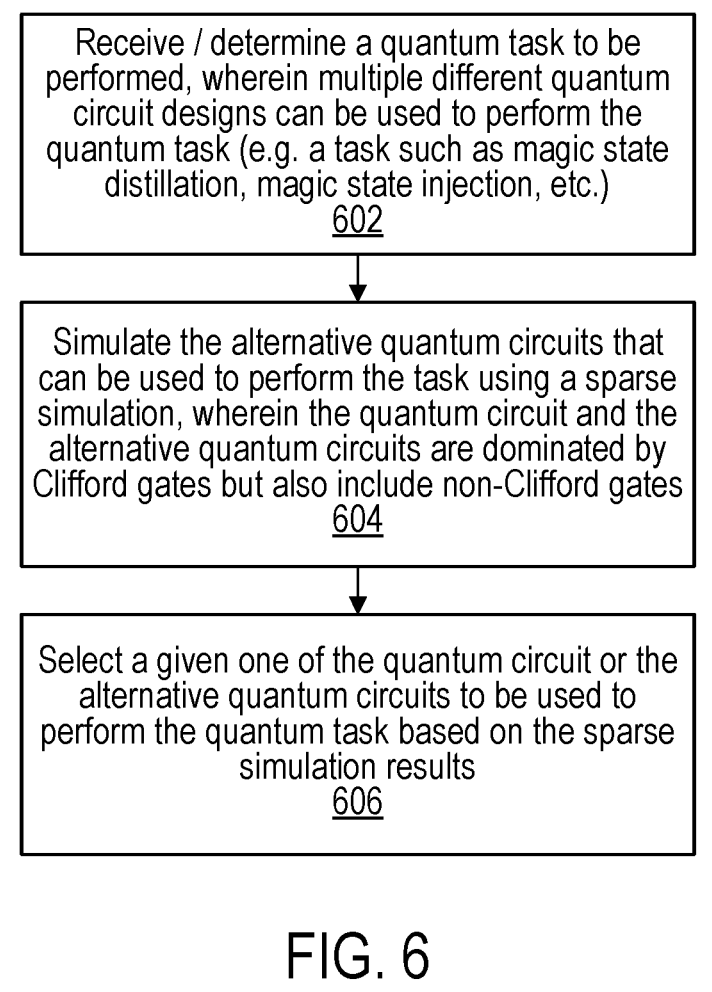

Receive / determine a quantum task to be performed, wherein multiple different quantum circuit designs can be used to perform the quantum task (e.g. a task such as magic state distillation, magic state injection, etc.)
602

Simulate the alternative quantum circuits that can be used to perform the task using a sparse simulation, wherein the quantum circuit and the alternative quantum circuits are dominated by Clifford gates but also include non-Clifford gates
604

Select a given one of the quantum circuit or the alternative quantum circuits to be used to perform the quantum task based on the sparse simulation results
606

FIG. 6

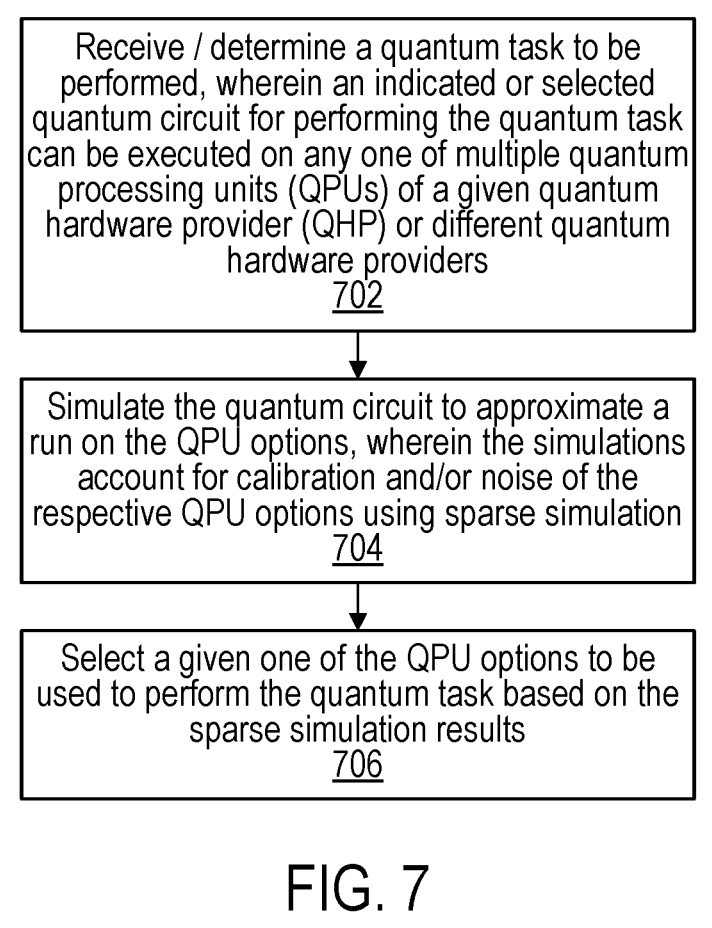

Receive / determine a quantum task to be performed, wherein an indicated or selected quantum circuit for performing the quantum task can be executed on any one of multiple quantum processing units (QPUs) of a given quantum hardware provider (QHP) or different quantum hardware providers
702

Simulate the quantum circuit to approximate a run on the QPU options, wherein the simulations account for calibration and/or noise of the respective QPU options using sparse simulation
704

Select a given one of the QPU options to be used to perform the quantum task based on the sparse simulation results
706

FIG. 7

SPARSE SIMULATION OF CLIFFORD-DOMINATED QUANTUM CIRCUITS

BACKGROUND

Quantum computing utilizes the laws of quantum physics to process information. Quantum physics is a theory that aims to describe the behavior of reality at the fundamental level. It is currently the only physical theory that is capable of consistently predicting the behavior of microscopic quantum objects like photons, molecules, atoms, and electrons.

A quantum computer is a device that utilizes quantum physics to allow one to write, store, process and read out information encoded in quantum states, e.g., the states of quantum objects. A quantum object is a physical object that behaves according to the laws of quantum physics. The state of a physical object is a description of the object at a given time.

In quantum physics, the state of a two-level quantum system, or simply, a qubit, can be represented as a list of two complex numbers whose squares sum up to one. Each of the two numbers is called an amplitude, or quasi-probability, and their squared absolute values are probabilities that a measurement of the qubit results in zero or one. A fundamental and counterintuitive difference between a probabilistic bit (e.g., a classical zero or one bit) and the qubit is that a probabilistic bit represents a lack of information about a two-level classical system, while a qubit contains maximal information about a two-level quantum system.

Quantum computers are based on such quantum bits (qubits), which may experience the phenomena of "superposition", "entanglement", and "interference". Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum systems, such that the quantum systems are inextricably linked even if separated by great distances. Interference is what allows probability amplitudes of different computational basis states to interact in a way that either increases or decreases the probability of observing a certain outcome (e.g., constructive and destructive interference).

A quantum algorithm comprises a reversible transformation acting on qubits in a desired and controlled way, followed by a measurement on one or multiple qubits. For example, if a system has two qubits, a transformation may be modeled as modifying four numbers; with three qubits this becomes eight numbers, and so on. In this representation, a quantum algorithm acts on a list of numbers exponentially large as dictated by the number of qubits. To implement a transform, the transform may be decomposed into small operations acting on a single qubit, or a pair of qubits, as an example. Such small operations may be called quantum gates and a specific arrangement of the quantum gates implements a quantum circuit.

BRIEF DESCRIPTION OF THE DRAWINGS

FIG. 6 is a flowchart illustrating a process for providing a selection or recommendation of a quantum circuit to use to perform a given quantum task, wherein the selection or recommendation is determined based, at least in part, on simulation results of a sparse simulation of Clifford-dominated quantum circuits, according to some embodiments.

FIG. 7 is a flowchart illustrating a process for providing a selection or recommendation of a quantum processing unit (QPU) to use to perform a given quantum task, wherein the selection or recommendation is determined based, at least in part, on simulation results of a sparse simulation of Clifford-dominated quantum circuits, according to some embodiments.

Figure 1:
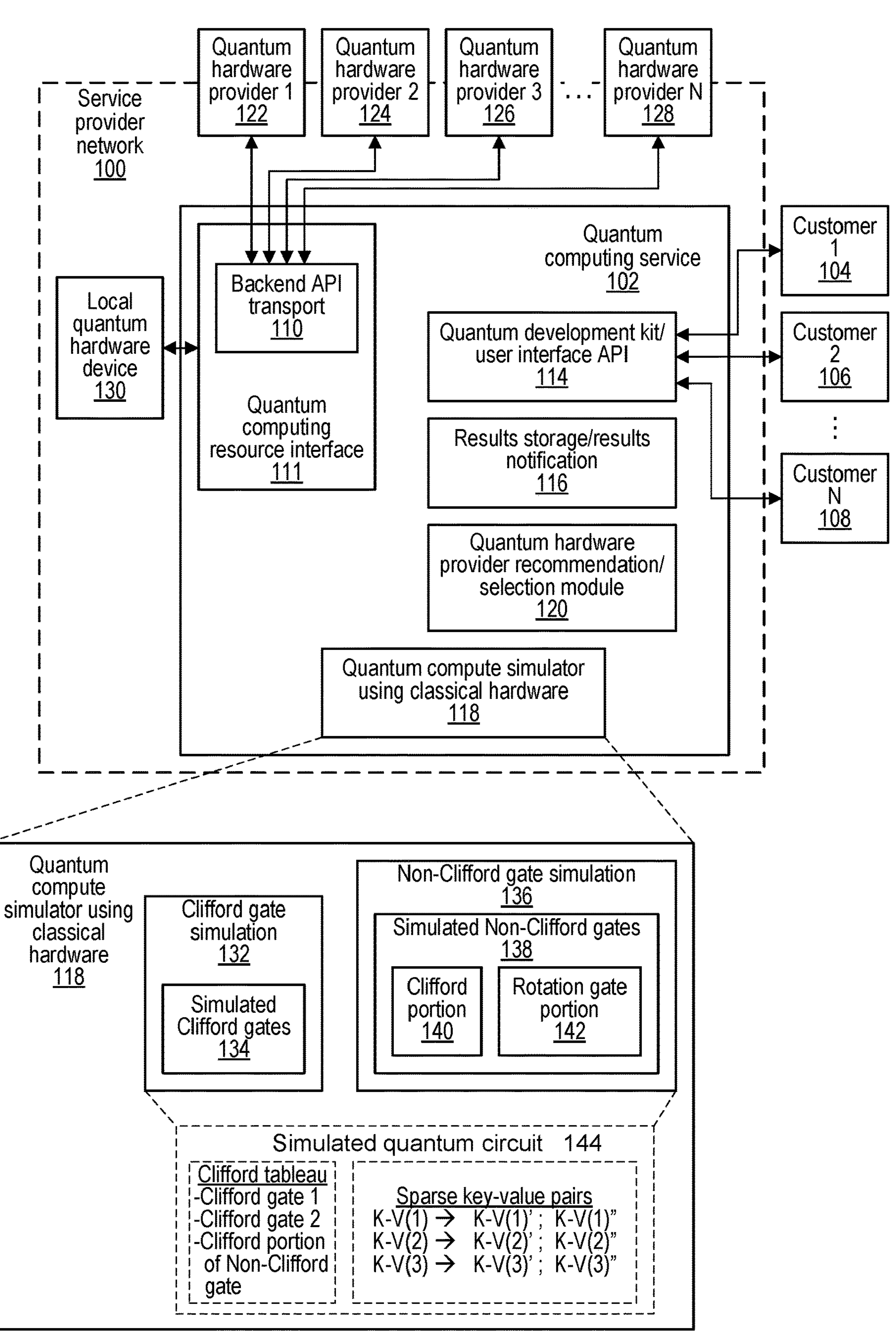
FIG. 1 illustrates a quantum computing service of a service provider network that includes a quantum computing simulator using classical hardware configured to perform sparse simulation of Clifford-dominated quantum circuits, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for providing quantum computing services to customers and enabling customers to seamlessly use one or more quantum computing technologies. Additionally, the disclosure relates to simulation services that may be provided by a quantum computing service, such as sparse simulation of Clifford-dominated quantum circuits.

Simulation of quantum circuits may be used in various ways, such as to provide simulation results in lieu of execution of a quantum circuit on an actual quantum computer, to experiment with or otherwise optimize a quantum circuit prior to execution on a quantum computer, to improve processes of a quantum computer, such as magic state distillation and/or magic state injection, as just a few examples.

For example, some quantum algorithms, such as a variational quantum eigensolver or a quantum approximate optimization algorithm (as a few examples), show promising potential in solving real-world problems, such as chemistry problems. However, a number of qubits and gates required to execute such algorithms on actual quantum computers may exceed the capacities of currently available quantum computers. But, in lieu of execution on an actual quantum computer, a simulator may be used to simulate results of such algorithms. This may allow further development of quantum algorithms to proceed in parallel with development of larger quantum computers.

However, simulation of quantum circuits using classical computing resources may itself be resource intensive. For example, some simulation techniques may involve calculations that cannot feasibly be completed on standard classical hardware and/or that may take an extended amount of time to perform. Also, some simulation techniques may perform well for quantum circuits comprising only Clifford gates but may not be feasible for simulating quantum circuits that are dominated with Clifford gates but that also include a non-trivial number of non-Clifford gates.

For example, simulators based on tensor network contraction perform extremely well on low-depth quantum circuits, but incur large overheads for deep circuits. Note the depth of a quantum circuit refers to a path length of gates acting on a qubit. For example, a quantum circuit with three gates acting on the same qubit would have a depth of 3. In contrast, highly-optimized state vector simulators perform well when the depth is large and the number of qubits is less than about 45. Other simulators that only simulate classical gates (e.g., Toffoli, or double-controlled NOT, controlled NOT, and NOT gates) on computational basis states and gate sets that only include Clifford gates may perform efficient simulation on classical hardware.

However, in contrast to previous approaches, sparse simulation of Clifford-dominated quantum circuit may efficiently perform simulation on standard classical hardware, wherein the simulation is for quantum circuits comprising larger numbers of qubits and/or larger numbers of non-Clifford gates than are feasible with previous simulation techniques. The sparse simulation of Clifford-dominated quantum circuits may be viewed as a "sparse Clifford simulation" that includes a combination of sparse simulation and Clifford frame tracking. For example, quantum circuits with up to 16 arbitrary rotation gates (e.g., non-Clifford gates) may be efficiently simulated. As another example, the disclosed sparse simulation of Clifford-dominated quantum circuits may efficiently simulate a benchmark quantum circuit, such as the hidden shift circuit, comprising up to 60 qubits and 20 Toffoli gates. This exceed performance abilities of the other techniques mentioned above with regard to the benchmark hidden shift circuit.

In some embodiments, a quantum computing service may provide customers with access to a plurality of quantum simulators, and may provide recommendations on which simulator to use to simulate a given quantum circuit based on characteristics of the given quantum circuit that is to be simulated, such as: (1) a number of non-Clifford gates; (2) a number of qubits; and/or (3) a sparsity of the quantum circuit. Note that there are two types of sparsity described herein. Sparsity of the quantum circuit, such as referenced in element (3), refers to a ratio (e.g. fraction) of qubits to gates included in the quantum circuit. For example, if the fraction of the number of qubits included in the quantum circuit divided by the number of gates included in the quantum circuit is large, then the quantum circuit can be considered to be sparse (e.g. gates are sparse in relation to qubits). Another type of sparsity is the sparsity of the computational basis state, which, as used herein, refers to a degree to which computational basis states of a quantum circuit have non-zero probability amplitudes. Thus, a quantum circuit wherein most or a majority of the possible computational basis states have associated zero amplitude probabilities of occurring, may be considered to have a sparse computational basis state. On the other hand, for a quantum circuit wherein a large number of possible computational basis states that have associated non-zero probability amplitudes, the computational basis state of the quantum circuit may be considered to be dense.

In some embodiments, a service provider network system includes an interface to quantum computing resources, such as quantum processing units of quantum hardware providers associated with the quantum computing service and/or local quantum processing units of the quantum computing service. The service provider network system also includes one or more classical computing devices configured to implement a quantum computing simulator, such as a simulator for sparse Clifford-dominated quantum circuits.

To perform simulation, the classical computing devices may be configured to receive a definition of a quantum circuit to be simulated and represent a state of the quantum circuit using a Clifford tableau and a set of key-value pairs. The Clifford tableau may keep track of Clifford operations performed in the simulation of the quantum circuit. The key-value pairs may include a computational basis state as a "key" and an associate non-zero probability amplitude for the corresponding computational basis state as a "value" of the key-value pair. As noted above, the simulation may be performed for quantum circuits with sparse computational basis states, wherein several of the computational basis states have zero probability amplitudes, or said another way, a minority of the computational basis states have non-zero probability amplitudes. To perform the simulation, the classical computing devices may further be configured to apply the Clifford gates of the quantum circuit being simulated by updating the Clifford tableau to reflect the application of the Clifford gates. Additionally, the classical computing devices may be configured to apply any non-Clifford gates of the quantum circuit being simulated by first representing the non-Clifford gates as having a Clifford portion (e.g., a Clifford gate representation of a portion of the non-Clifford gate) and a non-Clifford rotational portion (e.g., a non-Clifford rotational gate representation of a portion of the non-Clifford gate). The Clifford gate portion may be applied by updating the Clifford tableau in a similar manner as is performed for the Clifford gates. To apply the rotational portion of the non-Clifford gates, the classical computing devices may be configured to apply a rotational term that is at most 2 sparse and which causes the size of the set of sparse key value pairs being used to represent a state of the quantum circuit being simulated to increase by at most a factor of two for each non-Clifford gate applied. To perform the simulation, the classical computing devices may further be configured to provide simulation results that simulate execution of the quantum circuit being simulated based on the updated Clifford tableau and the resulting key-values. Note that the provided results may include expectation results (e.g., a probability of getting a given result) as opposed to a simulated result for an individual run. This may provide more useful simulation results than if a single simulated run result was returned. In some embodiments, at least some non-Clifford gates may be represented without using a physical decomposition into a Clifford portion and a rotational-gate portion. For example, some non-Clifford gates may be applied using a series of projections without requiring physical decomposition of the non-Clifford gate.

In some embodiments, noise information and/or calibration information for a quantum processing unit (QPU) that is being simulated may further be used by the simulator to account for noise or other hardware specific aspects of the QPU being simulated.

In some embodiments, a state $|\psi\rangle$ of a virtual n-qubit quantum computer may be represented as:

$$|\psi\rangle := C|\phi\rangle$$

where C is a Clifford unitary and $|\phi\rangle$ is represented as key-value pairs of the form (computational basis state, associated probability amplitude), e.g. ($|i\rangle$, $\alpha_i$) with $|i=i_n, \ldots, i_1\rangle$ (where n is a number of qubits in the quantum circuit) denoting a computational basis state, wherein $\alpha_i \in C$ with $\Sigma_i |\alpha_i|^2 = 1$, and $$|\phi\rangle = \sum_i \alpha_i |i\rangle$$

Note that only key-value pairs with non-zero probability amplitudes are stored, so key-value pairs with $|\alpha_i| > 0$.

Upon the application of a Clifford gate (K) to the overall state $|\psi\rangle$ the Clifford frame and key-value pair representation is updated by accounting for the Clifford gate in a Clifford tableau (which tracks the current Clifford frame). Said another way, the Clifford frame C is updated to C'. For example:

$$|\psi\rangle \rightarrow KC|\phi\rangle = C'|\phi\rangle$$

where C' is the Clifford obtained by applying the Clifford gate K to the Clifford tableau representing C.

Upon the application of any non-Clifford gates of the quantum circuit being simulated, the non-Clifford gate is first written as a Clifford portion and a rotational portion (e.g., one or more Clifford gates and a rotational gate, such as $R_z(\theta)$, where $$R_Z(\theta) := e^{-0.5i\theta Q}$$

with Z=diag (1,−1) denoting a Pauli-Z gate. An $R_Z(\theta)$ gate may then be applied to $|\psi\rangle$ by observing that for an n-qubit Pauli P $$C^\dagger e^{-0.5i\theta P} C = e^{-0.5i\theta Q}$$

where $Q := C^\dagger PC$ is again an n-qubit Pauli gate. Thus, applying $e^{-0.5i\theta Q}$ to $|\phi\rangle$ is equivalent to applying $e^{-0.5i\theta P}$ to $|\psi\rangle$, since $$Ce^{-0.5i\theta Q}|\phi\rangle = e^{-0.5i\theta P} C|\phi\rangle = e^{-0.5i\theta P}|\psi\rangle$$

Moreover, since for the n-qubit Pauli Q $$e^{-0.5i\theta Q} = \cos(0.5\theta)\mathbb{1}_{2^n} - i\sin(0.5\theta)\, Q$$

is at most 2-sparse, the number of key-value pairs in $|\phi\rangle$ grows by at most a factor of 2 for each arbitrary rotation gate (e.g., rotational portion of a non-Clifford gate that is applied).

In some embodiments, measurement of a Pauli observable P on the state $|\psi\rangle$ can be achieved similarly. The probability of a +1-eigenvalue measurement is:

$$p(M_p = 1) = \left\langle \psi \left| \frac{\mathbb{1} + P}{2} \right| \psi \right\rangle = \left\| \frac{\mathbb{1} + Q}{2} |\phi\rangle \right\|^2.$$

Since $P|\psi\rangle = PC|\phi\rangle = CC^\dagger PC|\phi\rangle = CQ|\phi\rangle$ and C is unitary, the measurement probability may be computed by applying the projector on the +1-eigenstate of the transformed Pauli Q to $|\phi\rangle$ and then computing the norm of the resulting state:

$$p(M_p = 1) = \left\| \frac{\mathbb{1} + Q}{2} |\phi\rangle \right\|^2.$$

Example Quantum Computing Service

As further discussed below, the sparse simulation of Clifford dominated quantum circuits may be used in a quantum computing service to improve the functioning of the quantum computers, such as to optimize magic state distillation, magic state injection etc. Also, the sparse simulation of Clifford dominated quantum circuits may improve the quantum computing service by enabling a customer to efficiently simulate quantum circuits in order to select a QHP or otherwise decide whether or not to run a given quantum circuit. Also, as discussed above, the sparse simulation of Clifford dominated quantum circuits may enable the simulation of quantum circuits that was not previously feasible due to computational requirements of other simulation techniques.

It should be noted that quantum computers may be difficult and costly to construct and operate. Also, there are varying quantum computing technologies under development with no clear trend as to which of the developing quantum computing technologies may gain prominence. Thus, potential users of quantum computers may be hesitant to invest in building or acquiring a particular type of quantum computer, as other quantum computing technologies may eclipse a selected quantum computing technology that a potential quantum computer user may invest in. Also, successfully using quantum computers to solve practical problems may require significant trial and error and/or otherwise require significant expertise in using quantum computers.

As an alternative to building and maintaining a quantum computer, potential users of quantum computers may instead prefer to rely on a quantum computing service to provide access to quantum computers and simulation services. Also, in some embodiments, a quantum computing service, as described herein, may enable potential users of quantum computers to access quantum computers based on multiple different quantum computing technologies and/or paradigms, without the cost and resources required to build or manage such quantum computers. Also, in some embodiments, a quantum computing service, as described herein, may provide various services that simplify the experience of using a quantum computer such that potential quantum computer users lacking deep experience or knowledge of quantum mechanics, may, never the less, utilize quantum computing services to solve problems.

Also, in some embodiments, a quantum computing service, as described herein, may be used to supplement other services offered by a service provider network. For example, a quantum computing service may interact with a classical computing service to execute hybrid algorithms. In some embodiments, a quantum computing service may allow a classical computer to be accelerated by sending particular tasks to a quantum computer for execution, and then further performing additional classical compute operations using the results of the execution of a quantum computing object on the quantum computer. For example, a quantum computing service may allow for the acceleration of virtual machines implemented on classical hardware in a similar manner as a graphics processing unit (GPU) may accelerate graphical operations that otherwise would be performed on a central processing unit (CPU).

In some embodiments, a quantum computing service may provide potential quantum computer users with access to quantum computers using various quantum computing technologies, such as quantum annealers, ion trap machines, superconducting machines, photonic devices, etc. In some embodiments, a quantum computing service may provide customers with access to at least three broad categories of quantum computers including quantum annealers, circuit-based quantum computers, and analog or continuous variable quantum computers. As used herein, these three broad categories may be referred to as quantum computing paradigms.

In some embodiments, a quantum computing service may be configured to provide simulation services using classical hardware based computing instances to simulate execution of a quantum circuit on a quantum computer. In some embodiments, a quantum computing service may be configured to perform general simulation and/or simulation that specifically simulates execution of a quantum circuit on a particular type of quantum computer of a particular quantum computer technology type or paradigm type. In some embodiments, sparse simulation of Clifford-dominated quantum circuits (as described herein) may be performed by a quantum computing service on behalf of customers. In some embodiments, simulation may be fully managed by a quantum computing service on behalf of a customer of the quantum computing service. For example, the quantum computing service may reserve sufficient computing capacity on a virtualized computing service of the service provider network to perform simulation without customer involvement in the details of managing the resources for the simulator.

In some embodiments, a quantum computing service may include a dedicated console that provides customers access to multiple quantum computing technologies. Furthermore, the quantum computing service may provide a quantum algorithm development kit that enables customers with varying levels of familiarity with quantum circuit design to design and execute quantum circuits. In some embodiments, a console of a quantum computing service may include various application programmatic interfaces (APIs), such as:

- (Create/Delete/Update/Get/List) Simulator-Configuration-create, read, update, and delete (CRUD) operations for simulator configuration objects.
- (Start/Cancel/Describe) Simulator—used to control each of the user-defined simulator instances.
- (List/Describe) quantum processor units (QPUs)—retrieves quantum computer hardware information.
- (Create/Cancel/List/Describe) Job—used to manage the lifecycle of a quantum job.
- (Assign/Update/List) Quality of Service (QoS) guarantee—used to manage QoS guarantees for quantum jobs and/or quantum tasks.
- (Create/Cancel/List/Describe) Task—used to manage the lifecycle of individual quantum tasks/quantum objects.

In some embodiments, a quantum algorithm development kit may include a graphical user interface, APIs or other interface to allow customers of a quantum computing service to define quantum objects, such as quantum tasks, algorithms or circuits, using the quantum algorithm development kit. In the some embodiments, the quantum algorithm development kit may include an interface option that enables customers to share the quantum objects with other customers of the quantum computing service. For example, the quantum algorithm development kit may include a marketplace that allows customers to share or sell particular quantum objects with other customers. In some embodiments, the quantum algorithm development kit may include an interface element that allows customers to select a QoS to be applied for a quantum job or quantum tasks defined via the quantum algorithm development kit.

In some embodiments, a quantum computing service may include a public application programmatic interface (API) that accepts quantum objects submitted by a customer of the quantum computing service. Additionally, the quantum computing service may include a back-end API transport that is non-public. The back-end API transport may enable quantum circuits to be transported from a centralized location that implements the quantum computing service, such as one or more data centers of a service provider network, to an edge computing device at a particular quantum hardware provider location where the quantum circuit is to be executed. In some embodiments, quantum objects or quantum tasks may be executed using an internal QPU of the quantum computing service without using a back-end API transport to transport the quantum job or quantum task to an external quantum hardware provider location.

In some embodiments, results of the execution of a quantum circuit on a quantum computer at a quantum hardware provider location may be provided to the edge computing device at the quantum hardware provider location. The edge computing device may automatically transport the results to a secure storage service of the service provider network, where the customer can access the results using the storage service of the service provider network or via a console of the quantum computing service. Likewise, results of execution of a quantum circuit via an internal QPU may be accessed via the console of the quantum computing service.

In some embodiments, the results stored to the secure storage service may be seamlessly used by other services integrated into the service provider network, such as a machine learning service, a database service, an object-based storage service, a block-storage service, a data presentation service (that reformats the results into a more usable configuration), etc. For example, in some embodiments, a machine learning service may be used to optimize a quantum algorithm or quantum circuit. For example, the machine learning service may cause various versions of a quantum algorithm or quantum circuit to be run on a quantum computer via a quantum computing service. The machine learning service may also be provided access to results of running the quantum algorithms or quantum circuits. In some embodiments, the machine learning service may cause the quantum algorithms or quantum circuits to be run on various different quantum computing technology based quantum computers. Based on the results, the machine learning service may determine one or more optimizations to improve the quantum algorithms or quantum circuits.

FIG. 1 illustrates a quantum computing service of a service provider network that enables customers to access quantum computers that use multiple quantum computing technologies, wherein the quantum computing service includes a simulator configured to perform simulation of sparse Clifford-dominated quantum circuits, according to some embodiments.

Service provider network 100 includes quantum computing service 102. In some embodiments, service provider network 100 may include data centers, routers, networking devices, etc., such as of a cloud computing provider network. In some embodiments, customers 104, 106, and 108 and/or additional customers of service provider network 100 and/or quantum computing service 102, may be connected to the service provider network 100 in various ways, such as via a logically isolated connection over a public network, via a dedicated private physical connection, not accessible to the public, via a public Internet connection, etc.

Also, quantum computing service 102 is connected to quantum hardware providers 122, 124, 126, and 128. In some embodiments, quantum hardware providers 122, 124, 126, and 128 may offer access to run quantum programs and/or quantum circuits on quantum computers that operate based on various different types of quantum computing technologies or paradigms, such as based on neutral atom, ion-trap, superconducting materials, photons, etc.

Figure 3:
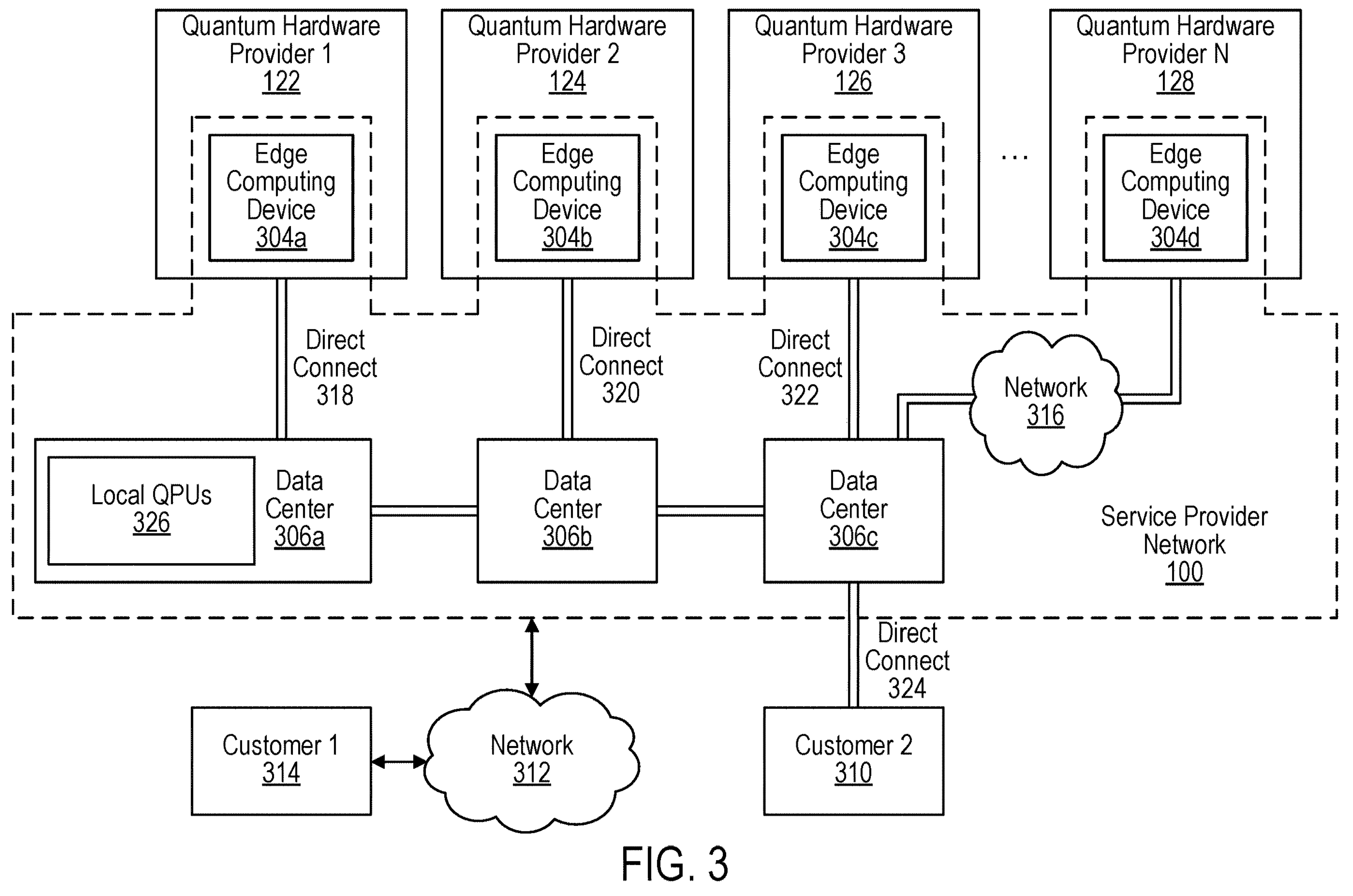
FIG. 3 illustrates an example configuration of the service provider network that includes edge computing devices of a quantum computing service physically located at quantum hardware provider locations, according to some embodiments.

As discussed in more detail in FIG. 3, in some embodiments, a service provider network 100 may be extended to include one or more edge computing devices physically located at quantum hardware provider locations, such as in a facility of quantum hardware providers 122, 124, 126, and 128. Physically locating an edge computing device of a service provider network 100 on premises at a quantum hardware provider facility may extend data security and encryption of the service provider network 100 into the quantum hardware providers 122, 124, 126, and 128 facilities, thus ensuring the security of customer data. Also, physically locating an edge computing device of a service provider network 100 on premises at a quantum hardware provider facility may reduce latency between a compute instance of the service provider network and a quantum computer located at the quantum hardware provider facility. Thus, some applications, such as hybrid algorithms that are sensitive to network latencies may be performed by quantum computing service 102, whereas other systems without co-located classical compute capacity at a hardware provider location may have too high of latencies to perform such hybrid algorithms efficiently.

In some embodiments, quantum computing service 102 includes one or more back-end API transport modules 110, included in a quantum computing resource interface 111. In some embodiments, a back-end API transport module 110 may be primarily implemented on edge computing devices of the quantum computing service that are located at the quantum hardware provider locations (such as edge computing devices 304*a*, 304*b*, 304*c*, and 304*d* illustrated in FIG. 3). Also, in some embodiments, at least some of the back-end API transport functionality may be implemented on the one or more computing devices of the service provider network that implement the quantum computing service (such as computing devices in data center 306*a*, 306*b*, 306*c* illustrated in FIG. 3).

In some embodiments, back-end API transport 110 may be a non-public API that is accessible by an edge computing device of service provider network 100, but that is not publicly available. In some embodiments, edge computing devices at the quantum hardware providers 122, 124, 126, and 128 may periodically ping a quantum computing service side interface to the back-end API transport 110 to determine if there are any quantum circuits (or batches of quantum circuits) waiting to be transported to the edge computing device. If so, the edge computing device may perform an API call to the back-end API transport 110 to cause the quantum circuit to be transported over a private connection to the edge computing device and scheduled for execution on a quantum computer. As discussed herein, in some embodiments, the quantum circuits may be transported with accompanying metadata indicating a list of compilation passes and/or compilation parameters to be used to compile the quantum circuit for execution on a particular QPU. Also, the edge computing device may have been configured with a quantum machine image that enables the edge computing device to interface with a scheduling application of the quantum hardware provider, where the edge computing device is located, in order to schedule a time slot on the quantum computer of the quantum hardware provider to execute the quantum circuit via the back-end API transport 110.

In some embodiments, a quantum computing service 102 may include, a quantum algorithm development kit 114 and/or user interface application programmatic interface (API) 114, and a quantum compute simulator using classical hardware 118. In some embodiments, calibration information and/or other QPU specific information may be provided from QHPs 122, 124, 126, or 128, via back-end API transport 110 to the quantum computing service 102, wherein the QPU specific information comprises information about particular QPUs of the QHPs.

In some embodiments, results of executing the quantum circuit on the quantum computer at the quantum hardware provider location may be returned to the edge computing device at the quantum hardware provider location. The edge computing device and/or quantum computing service 102 may cause the results to be stored in a data storage system of the service provider network 100. In some embodiments, results storage/results notification module 116 may coordinate storing results and may notify a customer, such as customer 104, that the results are ready from the execution of the customer's quantum object, such as a quantum task, quantum algorithm, or quantum circuit. In some embodiments, results storage/results notification module 116 may cause storage space in a data storage service to be allocated to a customer to store the customer's results. Also, the results storage/results notification module 116 may specify access restrictions for viewing the customer's results in accordance with customer preferences.

In some embodiments, quantum computing service 102 includes quantum hardware provider recommendation/selection module 120. In some embodiments, quantum hardware recommendation/selection module 120 may make a recommendation to a quantum computing service customer as to which type of quantum computer or which quantum hardware provider to use to execute a quantum object submitted by the customer. Additionally, or alternatively, the quantum hardware provider recommendation/selection module 120 may receive a customer selection of a quantum computer type and/or quantum hardware provider to use to execute the customer's quantum object, such as a quantum task, quantum algorithm, quantum circuit, etc. submitted by the customer or otherwise defined with customer input.

In some embodiments, a recommendation provided by quantum hardware provider recommendation/selection module 120 may be based on one or more characteristics of a quantum object submitted by a customer and one or more characteristics of the quantum hardware providers supported by the quantum computing service 102, such as one or more of quantum hardware providers 122, 124, 126, or 128.

In some embodiments, quantum hardware provider recommendation/selection module may make a recommendation based on known data about previously executed quantum objects similar to the quantum object submitted by the customer. For example, quantum computing service 102 may store certain amounts of metadata about executed quantum objects and use such metadata to make recommendations. In some embodiments, a recommendation may include an estimated cost to perform the quantum computing task by each of the first and second quantum hardware providers. In some embodiments, a recommendation may include an estimated error rate for each of the first and second quantum hardware providers in regard to performing the quantum computing task. In some embodiments, a recommendation may include an estimated length of time to execute the quantum computing task for each of the first and second quantum hardware providers. In some embodiments, a recommendation may include various other types of information relating to one or more quantum hardware providers or any combination of the above.

In some embodiments, quantum compute simulator using classical hardware 118, may allow a customer to simulate one or more particular quantum computing technology environments. For example, a customer may simulate a quantum circuit in an annealing quantum computing environment and an ion trap quantum computing environment to determine simulated error rates. The customer may then use this information to make a selection of a quantum hardware provider to use to execute the customer's quantum circuit.

In some embodiments, quantum compute simulator using classical hardware 118 of quantum computing service 102, may be used to simulate a quantum algorithm or quantum circuit using classical hardware. For example, one or more virtual machines of a virtual computing service may be instantiated to process a quantum program or quantum circuit simulation job. In some embodiments, quantum compute simulator using classical hardware 118 may fully manage compute instances that perform quantum circuit or quantum program simulation. For example, in some embodiments, a customer may submit a quantum circuit or quantum program to be simulated and quantum compute simulator using classical hardware 118 may determine resources needed to perform the simulation job, reserve the resources, configure the resources, etc. In some embodiments, quantum compute simulator using classical hardware 118 may include one or more "warm" simulators that are pre-configured simulators such that they are ready to perform a simulation job without a delay typically involved in reserving resources and configuring the resources to perform simulation.

In some embodiments, the quantum compute simulator using classical hardware 118 may perform sparse simulation of Clifford-dominated quantum circuits as described further above. For example, a Clifford gate may be applied by a Clifford gate simulation component 132 by applying the Clifford gate to a Clifford tableau. Also, a non-Clifford gate simulation component 136 may apply non-Clifford gates using a Clifford portion 140 and a rotation gate portion 142. For example, simulated quantum circuit 144 may be simulated by applying the simulated Clifford gates 134 and Clifford portions 140 to the Clifford tableau for simulated quantum circuit 144. Also, a non-Clifford rotation gate portion 142 may be applied by applying a rotation term that is at most 2-sparse to one or more of the key-value pairs of the sparse key-value pair state representation. For example, a 2-sparse rotation term has been applied to key value 3 resulting in 2 versions of key value 3, K-V(3)' and K-V(3)". Note that in some embodiments a given one of the resulting key-value terms from the application of the 2-sparse rotation may map to an existing key-value term. In this case instead of the application of the 2-sparse rotation term resulting in 2 version of the key-value pair, one or more values of an existing key-value pair may be overwritten (e.g. the value of the key-value pair changed) due to application of the 2-sparse term.

Figure 2:
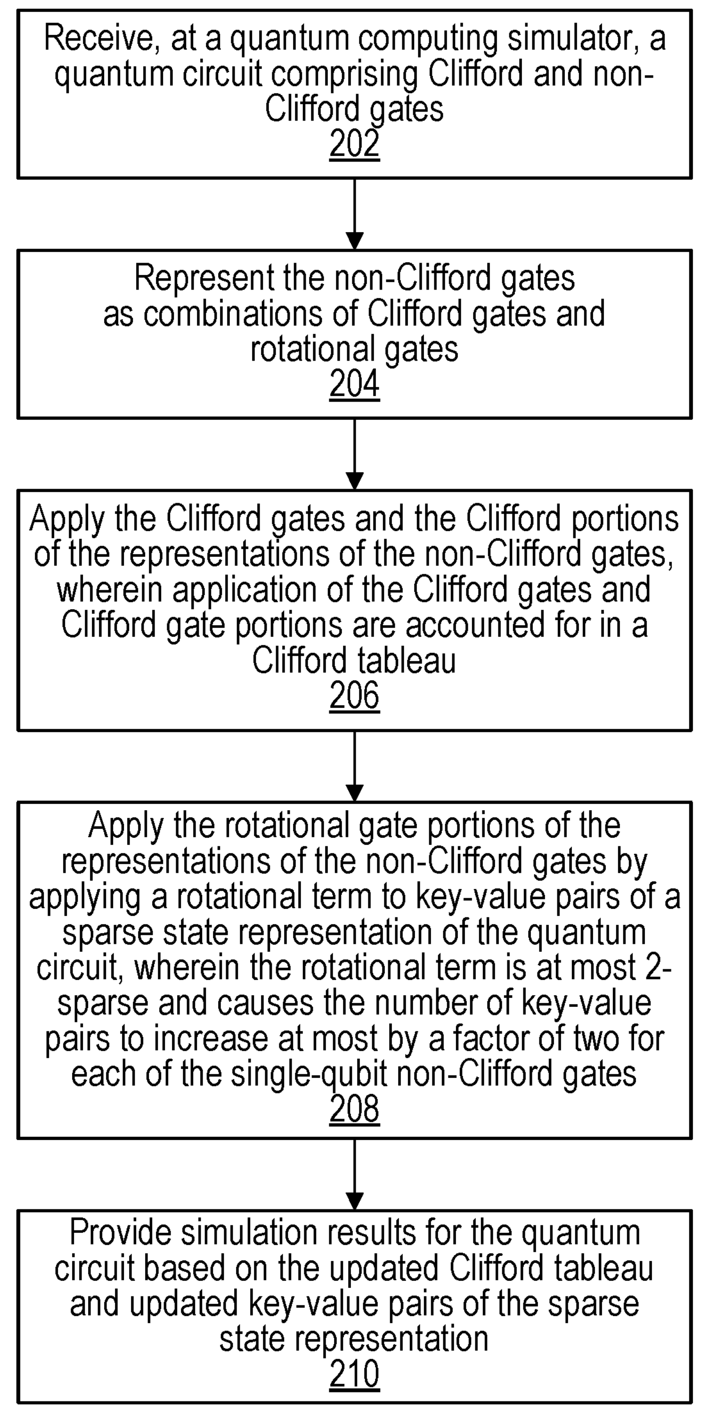
FIG. 2 is a flowchart illustrating a process for performing sparse simulation of Clifford-dominated quantum circuits, according to some embodiments.

FIG. 2 is a flowchart illustrating a process for performing sparse simulation of Clifford-dominated quantum circuits, according to some embodiments.

At block 202, a quantum circuit comprising both Clifford and non-Clifford gates is received at a quantum computing simulator, such as the quantum compute simulator using classical hardware included in quantum computing service 102, as shown in FIG. 1.

At block 204, the non-Clifford gates are represented as a combination of Clifford gates (i.e., Clifford portions) and non-Clifford rotational gates (i.e., rotational portions), such as Clifford portions 140 and rotation gate portions 142 illustrated in FIG. 1. This may be referred to herein as a "physical decomposition" of the non-Clifford gates. The non-Clifford gates that are being decomposed may include multi-qubit non-Clifford gates. In some embodiments, some multi-qubit non-Clifford gates may be represented without performing a physical decomposition of the multi-qubit non-Clifford gate. For example, some multi-qubit non-Clifford gates, such as a control, control, Z (CCZ) gate, may be represented as a series of projections. For example, the projections may provide a similar effect as a rotation, thus the series of projections may account for the rotational portion of the non-Clifford gate.

At block 206, the Clifford gates and the Clifford portions of the non-Clifford gates are applied by updating the Clifford tableau, such as shown for simulated quantum circuit 144 in FIG. 1.

At block 208, the non-Clifford rotational portions of the non-Clifford gates are applied to the set of key-value pairs by applying a rotation term (e.g., $e^{-0.5i\theta Q}$, where Q is an n-qubit Pauli that is found using conjugation by a Clifford frame). In some embodiments, the rotational term may correspond to a rotation gate about the Z axis given by $R_z(\theta)=e^{-0.5i\theta Z}$. As mentioned above, in some embodiments, some multi-qubit non-Clifford gates may be represented using a Clifford portion and a rotational portion, wherein the rotational portion is applied using a rotation gate, as described above, or by applying a series of projections. Thus, in some embodiments, for some multi-qubit non-Clifford gates, such as the CCZ gate, a series of projection may alternatively be applied at block 208 to account for the rotational term of the multi-qubit non-Clifford gate.

Figure 4:
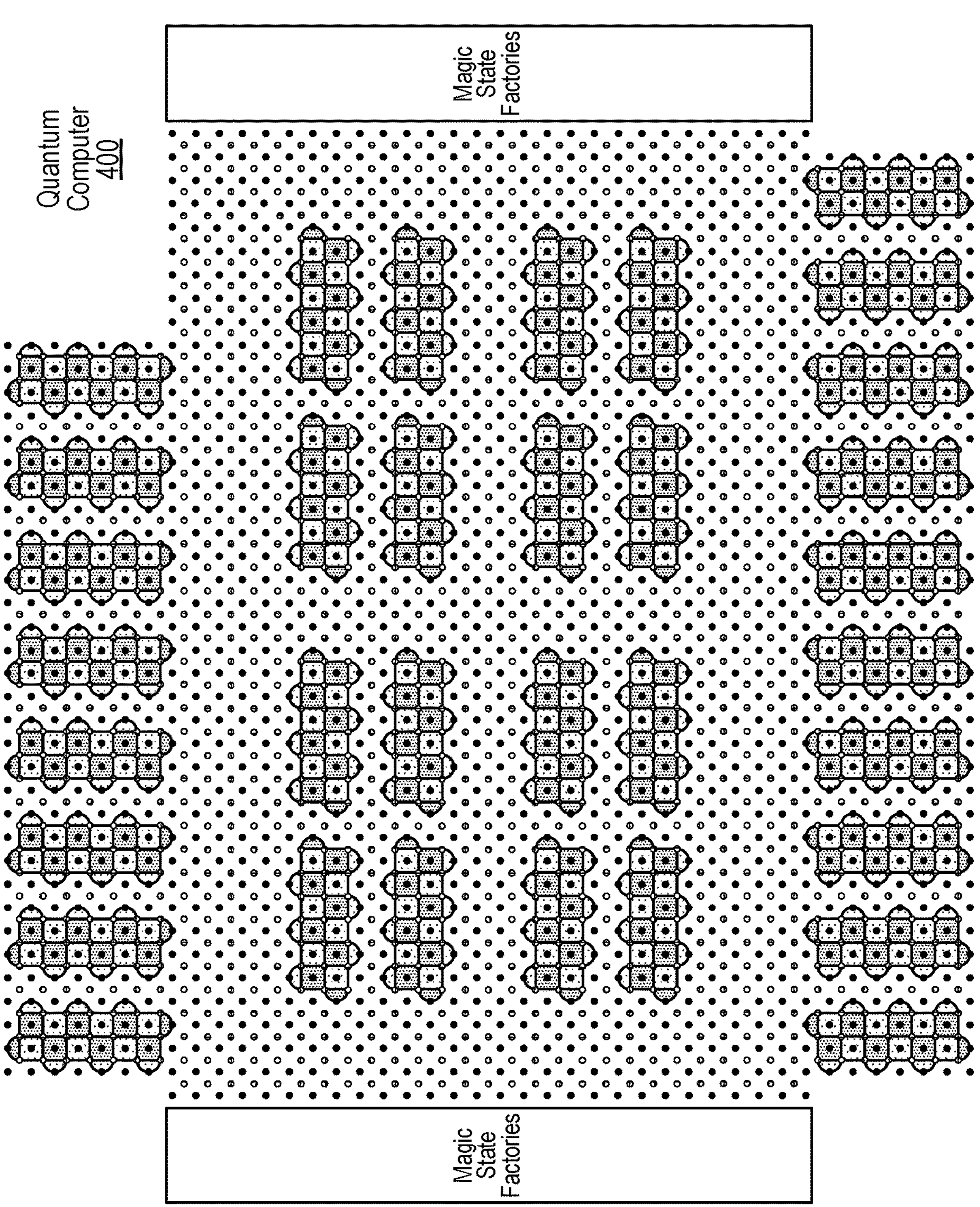
FIG. 4 illustrates an example quantum computer, wherein sparse simulation of Clifford-dominated quantum circuits may be used for simulation of the execution of a quantum circuit in the quantum computer core, simulation of magic state distillation in the magic state factories that provide magic states for use in executing quantum circuits in the quantum computer core, and/or simulation of other processes, such as injection of the distilled magic states, according to some embodiments.

At block 210, simulation results are provided, for example to customers 104 through 108, or to quantum hardware provider recommendation/selection module 120, or to quantum computing resource interface 111. In some embodiments, the results may be used to optimize an implementation and a QPU, such as local quantum hardware device 130 or QHPs 122, 124, 126, 128, etc. In some embodiments, a quantum circuit used internally by a quantum computer such as in magic state distillation or magic state injection may be optimized using simulation. For example, FIG. 4 illustrates a quantum computer (which may be implemented at local QPU 130 or external QPUs of QHPs 122, 124, 126, 128, etc. The quantum computer 400 includes magic state factories that may perform magic state distillation and injection into the compute core regions between the magic state factories. In some embodiments, logical qubits may be implemented using surface codes as shown in FIG. 4 and magic states may be used to perform quantum operations between logical qubits implemented using the surface codes, as an example.

In some embodiments, Pauli noise may be added to the sparse simulation of Clifford-dominated quantum circuits by including a sampler around the quantum circuit that adds noise at each X, Y, or Z location. The noise may be sampled from a noise model that represents a noise profile of a QPU that is to be simulated. For example, the noise model may be generated using calibration data and/or other data about the QPU that is to be simulated.

FIG. 3 illustrates edge computing devices of a quantum computing service physically located at quantum hardware provider locations, according to some embodiments.

In some embodiments, service provider network 100, as illustrated in FIG. 1, may include one or more data centers connected to each other via private or public network connections. Also, edge computing devices located at quantum hardware provider locations may be connected to a service provider network via private or public network connections. For example, service provider network 100 illustrated in FIG. 3 includes data centers 306*a*, 306*b*, and 306*c* that are connected to one another via private physical network links of the service provider network 100. In some embodiments, a customer of the service provider network may also be connected via a private physical network link that is not available to the public to carry network traffic, such as a physical connection at a router co-location facility. For example, customer 310 is connected to a router associated with data center 306*c* via direct connection 324. In a similar manner, edge computing devices located at quantum hardware provider locations may be connected to a service provider network via a private physical network link that is not available to carry public network traffic.

For example, edge computing device 304*a* located at quantum hardware provider location 302*a* is connected to a router at data center 306*a* via direct connection 318. In a similar manner, edge computing device 304*b* at quantum hardware provider location 302*b* is connected to a router at data center 306*b* via direct connection 320. Also, edge computing device 304*c* at quantum hardware provider 302*c* is connected to a router at data center 306*c* via direct connection 322.

Also, in some embodiments an edge computing device of a service provider network located at a quantum hardware provider location may be connected to the service provider network via a logically isolated network connection over a shared network connection, such as via the Internet or another public network. For example, edge computing device 304*d* at quantum hardware provider location 302*d* is connected to data center 306*c* via a logically isolated network connection via network 316. In a similar manner, in some embodiments a customer, such as customer 314, may be connected to service provider network 100 via public network 312.

In some embodiments, a quantum computing service such as quantum computing service 102, may be implemented using one or more computing devices in any of data centers 306*a*, 306*b*, 306*c*, etc. Also, the quantum computing service 102, may provide customers, such as customer 314 or customer 310, access to quantum computers in any of quantum hardware provider locations 302*a*, 302*b*, 302*c*, 302*d*, etc. For example, a customer may not be restricted to using a quantum hardware provider in a local region where the customer is located. Instead, the customer may be allocated compute instances instantiated on a local edge computing device located at a selected quantum hardware provider location, such that the location of the customer does not restrict the customer's access to various types of quantum computing technology-based quantum computers.

In some embodiments, one or more of the data centers 306 may also include local quantum hardware devices, such as local QPUs 326.

FIG. 4 illustrates a quantum computer (which may be implemented at local QPU 130 or external QPUs of QHPs 122, 124, 126, 128, etc. The quantum computer 400 includes magic state factories that may perform magic state distillation and injection into the compute core regions between the magic state factories. In some embodiments, logical qubits may be implemented using surface codes as shown in FIG. 4 and magic states may be used to perform quantum operations between logical qubits implemented using the surface code, as an example. In some embodiments, sparse simulation of Clifford-dominated quantum circuits may be used to select and/or optimize a quantum circuit to be used to perform a task, such a magic state distillation, magic state injection, or other quantum computing operations in the compute core region. For example, an operator of a quantum computing service, may simulate performance of various quantum circuits available to perform magic state distillation and/or magic state injection on a given QPU and may select, based on the simulation results, a given one of the various quantum circuits as a quantum circuit selected to be used to perform the magic state distillation task in the magic state factories or a magic state injection task that injects a distilled magic state into the compute core regions.

Figure 5:
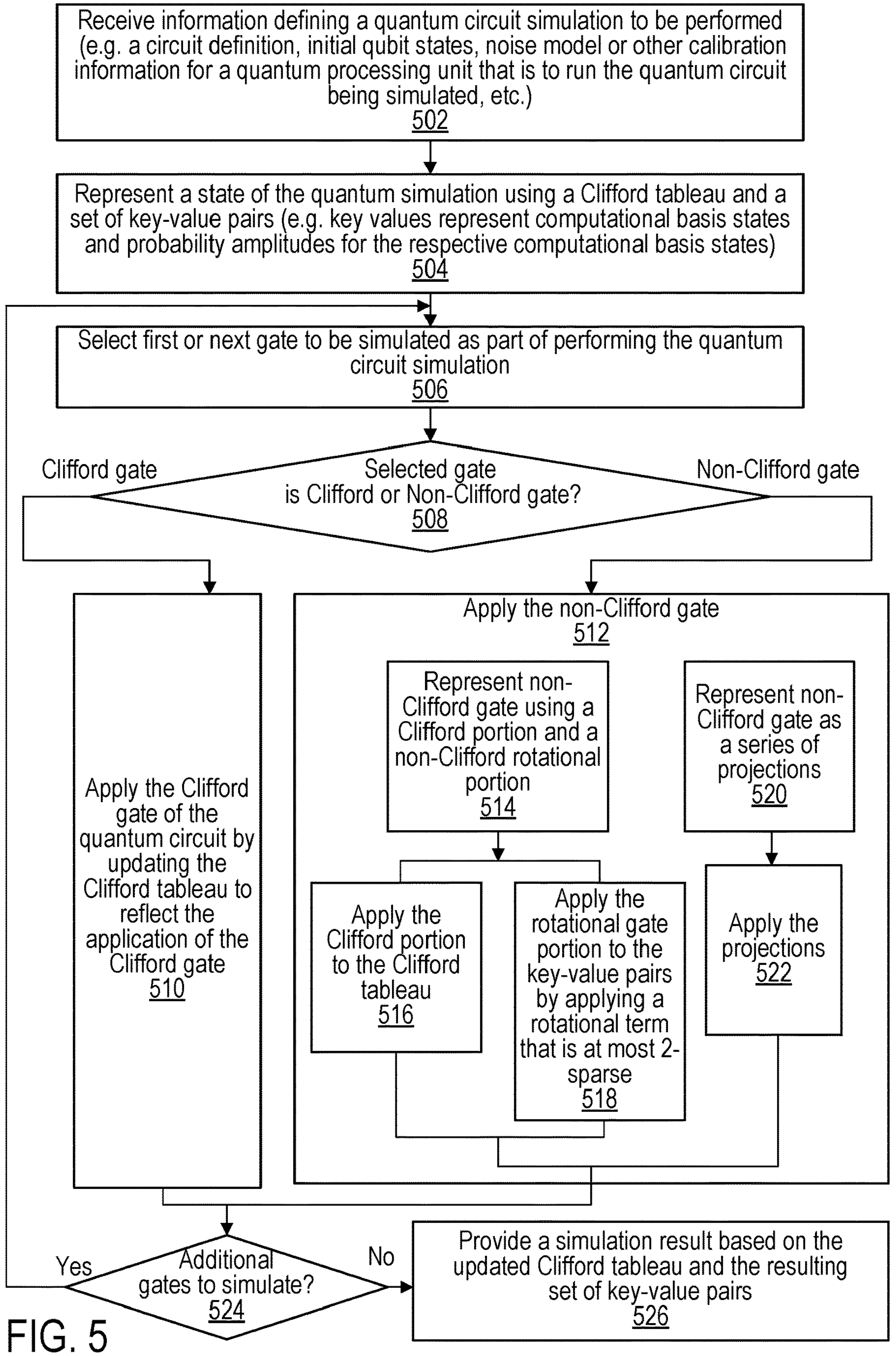
FIG. 5 is a flowchart illustrating a process for providing simulation services using a sparse simulation of Clifford-dominated quantum circuits, according to some embodiments.

FIG. 5 is a flowchart illustrating a process for providing simulation services using a sparse simulation of Clifford-dominated quantum circuits process, according to some embodiments.

At block 502, a quantum simulator, such as quantum simulator 118, receives information defining a quantum circuit simulation to be performed (e.g., a circuit definition, initial qubit states, noise model or other calibration information for a quantum processing unit that is to run the quantum circuit being simulated, etc.).

At block 504, a state of the quantum circuit being simulated is represented using a Clifford tableau and a set of key-value pairs, such as shown for simulated quantum circuit 144 in FIG. 1.

At block 506, a first (or next) gate to be simulated is selected. Also, at block 508, it is determined whether the gate being simulated is a Clifford or non-Clifford gate. If a Clifford gate, then at block 510 the Clifford tableau is updated to reflect application of the Clifford gate.

If the gate to be simulated (e.g. as selected at block 506) is a non-Clifford gate, the non-Clifford gate is applied at block 512. As discussed above, some non-Clifford gates may be applied using a physical decomposition into a Clifford portion of the non-Clifford gate and a rotational portion of the non-Clifford gate. Other non-Clifford gates may be applied using a series of projections.

For non-Clifford gates being applied using physical decomposition, at block 514, the non-Clifford gate being applied is represented using a Clifford portion and a non-Clifford rotational portion, such as Clifford portion 140 and rotational portion 142 shown in FIG. 1. Additionally, at block 516 the Clifford portion is applied by updating the Clifford tableau. Also, at block 518, the non-Clifford rotational portion is applied by applying a rotational term to the key-value pairs that is at most 2-sparse and that at most increases a number of key-value pairs of the set by a factor of 2 for each single-qubit non-Clifford gate applied. Alternatively, for non-Clifford gates being applied without using physical decomposition of the non-Clifford gate, at block 520, the non-Clifford gate is represented as a series of projections and at block 522 the series of projections are applied.

At block 524, it is determined whether or not there are additional gates in the quantum circuit that is being simulated that need to be evaluated (e.g. simulated). If so, the process reverts to block 506 and a next gate to simulate is selected. If not, at block 526, the simulation result is provided based on the updated Clifford tableau and the updated set of key-value pairs, that have been updated by applying the gates successively selected for simulation at block 506.

FIG. 6 is a flowchart illustrating a process for providing a selection or recommendation of a quantum circuit to use to perform a given quantum task, wherein the selection or recommendation is determined based, at least in part, on simulation results of a sparse simulation of Clifford-dominated quantum circuits, according to some embodiments.

At block 602, a quantum computing service, such as quantum computing service 102, receives or determines a quantum task to be performed, wherein multiple different quantum circuit designs can be used to perform the quantum task (e.g., a task such as magic state distillation, magic state injection, etc.).

At block 604, the quantum computing service simulates (e.g., using simulator 118) the alternative quantum circuits that can be used to perform the task using a sparse simulation, wherein the quantum circuit and the alternative quantum circuits are dominated by Clifford gates but also include non-Clifford gates.

At block 606, the quantum computing service selects a given one of the quantum circuit or the alternative quantum circuits to be used to perform the quantum task based on the simulation results.

FIG. 7 is a flowchart illustrating a process for providing a selection or recommendation of a quantum processing unit (QPU) to use to perform a given quantum task, wherein the selection or recommendation is determined based, at least in part, on simulation results of a sparse simulation of Clifford-dominated quantum circuits, according to some embodiments.

At block 702, a quantum computing service, such as quantum computing service 102, receives or determines a quantum task to be performed, wherein an indicated or selected quantum circuit for performing the quantum task can be executed on any one of multiple quantum processing units (QPUs) of a given quantum hardware provider (QHP) or different quantum hardware providers.

At block 704, the quantum computing service approximates (e.g., using simulator 118) the quantum circuit as if run on the QPU options, wherein the simulation results account for calibration and/or noise of the respective QPU options.

At block 706, the quantum computing service selects a given one of the QPU options to be used to perform the quantum task based on the sparse simulation results.

Illustrative Computer System

Figure 8:
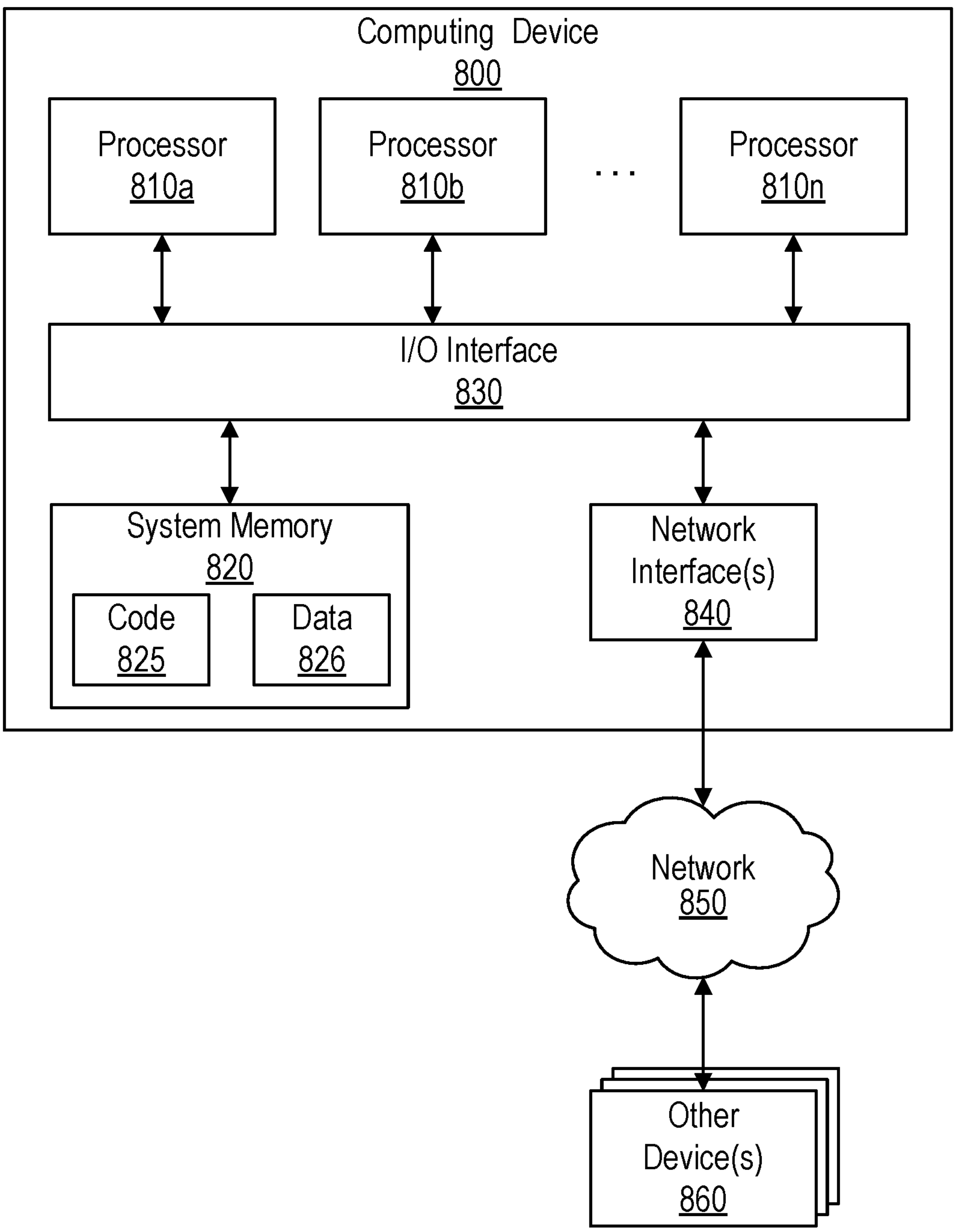
FIG. 8 is a block diagram illustrating an example classical computing device that may be used to perform sparse simulation of Clifford-dominated quantum circuits and/or other tasks in at least some embodiments.

FIG. 8 illustrates such a general-purpose computing device 800 as may be used in any of the embodiments described herein. In the illustrated embodiment, computing device 800 includes one or more processors 810 coupled to a system memory 820 (which may comprise both non-volatile and volatile memory modules) via an input/output (I/O) interface 830. Computing device 800 further includes a network interface 840 coupled to I/O interface 830.

In various embodiments, computing device 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA. In some implementations, graphics processing units (GPUs) may be used instead of, or in addition to, conventional processors.

System memory 820 may be configured to store instructions and data accessible by processor(s) 810. In at least some embodiments, the system memory 820 may comprise both volatile and non-volatile portions; in other embodiments, only volatile memory may be used. In various embodiments, the volatile portion of system memory 820 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 820 as code 825 and data 826.

In some embodiments, I/O interface 830 may be configured to coordinate I/O traffic between processor 810, system memory 820, and any peripheral devices in the device, including network interface 840 or other peripheral interfaces such as various types of persistent and/or volatile storage devices. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other devices 860 attached to a network or networks 850, such as other computer systems or devices as illustrated in FIG. 1 through FIG. 7, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may represent one embodiment of a computer-accessible medium configured to store at least a subset of program instructions and data used for implementing the methods and apparatus discussed in the context of FIG. 1 through FIG. 7. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 800 via I/O interface 830. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 800 as system memory 820 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 840. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system comprising:
- an interface to quantum computing resources; and
- one or more classical computing devices configured to implement a quantum computing simulator configured to:
  - receive information defining a quantum circuit to be simulated;
  - represent a state of the quantum circuit using:
    - a Clifford tableau; and
    - a set of key-value pairs representing possible outcomes of execution of the quantum circuit, wherein respective ones of the key-values pairs comprise:
      - a key corresponding to a computational basis state representing simulated states of qubits of the executed quantum circuit; and
      - a value corresponding to a probability amplitude representing a probability that qubits of the executed quantum circuit are in the states of the computational basis state of the key associated with the value;
    - apply Clifford gates of the quantum circuit by updating the Clifford tableau to reflect the application of the Clifford gates; and
    - apply non-Clifford gates of the quantum circuit by:
      - updating the Clifford tableau to reflect application of the non-Clifford gate; and/or
      - updating the set of key-value pairs to reflect application of the non-Clifford gate; and
  - provide simulation results of the quantum circuit, wherein the simulation results are used in optimizing the quantum circuit for execution on the quantum computing resources.

2. The system of claim 1 wherein to apply the non-Clifford gates of the quantum circuit, the quantum computing simulator is configured to:

represent respective ones of the non-Clifford, using a physical decomposition, as a Clifford gate portion and a non-Clifford rotational gate portion.

3. The system of claim 2, wherein said updating the Clifford tableau and said updating the set of key-value pairs that are performed as part of applying the non-Clifford gate comprises:

applying the Clifford gate portion of the non-Clifford gates to the Clifford tableau; and applying the non-Clifford rotational gate portion of the non-Clifford gates to the set of key-value pairs by applying a rotational term that is at most 2-sparse and which causes a number of key-value pairs of the set to increase by at most by a factor of two for each one of the non-Clifford gates that are applied.

4. The system of claim 1, wherein to apply the non-Clifford gates of the quantum circuit, the quantum computing simulator is configured to:

represent respective ones of the non-Clifford, using a non-physical decomposition, as a set of projections to be applied.

5. The system of claim 4, wherein said updating the Clifford tableau and said updating the set of key-value pairs that are performed as part of applying the non-Clifford gate comprises:

updating the Clifford tableau; and/or applying the set of projections.

6. The system of claim 1, wherein the quantum simulator is further configured to:

receive noise information for a given one of the quantum computing resources; and use the noise information in determining the simulation results, wherein the simulation results simulate execution of the quantum circuit on the given one of the quantum computing resources.

7. The system of claim 6, further comprising:

one or more computing devices configured to implement a quantum computing service configured to:

receive calibration information for a plurality of quantum processing units connected to the quantum computing service via the interface to the quantum computing resources;

cause the quantum computing simulator to simulate the quantum circuit for execution on the plurality of quantum processing units, wherein the respective simulations take into account the received calibration information for the respective quantum processing units; and select a given one of the quantum processing units to execute the quantum circuit based on the simulated results.

8. The system of claim 4, wherein the quantum circuit and the plurality of alternative version of the quantum circuit comprise quantum circuits for performing magic state distillation or magic state injection.

9. A method of simulating a quantum circuit, comprising:

representing respective ones of a plurality of multi-qubit non-Clifford gates included in the quantum circuit being simulated as a combination of Clifford gates and single qubit non-Clifford gates;

applying a Clifford gate portion of the multi-qubit non-Clifford gates to a Clifford tableau used in representing a state of the quantum circuit being simulated;

applying a non-Clifford rotational term that is at most 2-sparse and which causes a number of key-value pairs of a set of key-value pairs used in representing the state of the quantum circuit being simulated to increase by at most by a factor of two for each one of the single-qubit non-Clifford gates, of the multi-qubit non-Clifford gate representation, that are applied; and providing simulation results of the quantum circuit.

10. The method of claim 9, further comprising:

applying Clifford gates of the quantum circuit by updating the Clifford tableau to reflect the application of the Clifford gates.

11. The method of claim 9, wherein at any point during simulation of the quantum circuit a state of the simulator is represented by:

the Clifford tableau; and the set of key-value pairs, wherein the set of key-value pairs represent possible outcomes of execution of the quantum circuit on a given quantum processing unit, wherein respective ones of the key-values pairs comprise:

a key corresponding to a computational basis state representing simulated states of qubits of the possible execution outcomes of the quantum circuit; and a value corresponding to a probability amplitude representing a probability that qubits of the quantum circuit are in the states of the computational basis state of the key associated with the value.

12. The method of claim 9, wherein the set of key-value pairs is limited to key-value pairs comprising probability amplitudes, for corresponding computational basis states, that are non-zero.

13. The method of claim 12, wherein the limited set of key-value pairs with non-zero probability amplitudes included in the set of key-value pairs considered in simulating the quantum circuit are less than a total number of possible computational basis possible based on a qubit count of the quantum circuit being simulated.

14. The method of claim 9, wherein providing the simulation results comprises:

measuring a Pauli observable at a given location in the quantum circuit; wherein said measuring comprises:

projecting a state of the simulator at a given location onto an eigenstate of a measurement Pauli observable, wherein the state of the simulator prior to the projection has been transformed due to the application of the rotational term; and computing a norm of a resulting state, wherein the norm indicates an expectation value.

15. The method of claim 9, wherein the quantum circuit being simulated comprises more than 30 total qubits.

16. The method of claim 9, wherein the single-qubit non-Clifford gates are rotational gates about the Z-axis.

17. The method of claim 16, wherein respective ones of the rotational gates about the Z-axis are given by:

$$R_z(\theta) = e^{-0.5i\theta Z}$$

and the non-Clifford rotational term that is applied comprises:

$$e^{-0.5i\theta Q}$$

where Q is an n-qubit Pauli for which a Clifford frame and a conjugate of the Clifford frame have been applied.

18. One or more non-transitory, computer-readable, storage media storing program instructions, that when executed on or across one or more processors, cause the one or more processors to:

represent respective ones of a plurality of multi-qubit non-Clifford gates included in a quantum circuit being simulated as a combination of Clifford gates and single-qubit non-Clifford gates;

apply a Clifford gate portion of the non-Clifford gates to a Clifford tableau used in representing a state of the quantum circuit being simulated;

apply a non-Clifford rotational term that is at most 2-sparse and which causes a number of key-value pairs of a set of key-value pairs used in representing a state of the quantum circuit being simulated to increase by at most by a factor of two for each one of the single-qubit non-Clifford gates, of the multi-qubit non-Clifford gate representation, that are applied; and provide simulation results of the quantum circuit.

19. The one or more non-transitory, computer-readable, storage media of claim 18, wherein the state of the quantum circuit being simulated is represented by:

the Clifford tableau; and the set of key-value pairs, wherein the set of key-value pairs represent possible outcomes of execution of the quantum circuit on a given quantum processing unit, wherein respective ones of the key-values pairs comprise:

a key corresponding to a computational basis state representing simulated states of qubits of the executed quantum circuit; and a value corresponding to a probability amplitude representing a probability that qubits of the executed quantum circuit are in the states of the computational basis state of the key associated with the value.

20. The one or more non-transitory, computer-readable, storage media of claim 18, wherein the program instruction, when executed on or across the one or more processors, further cause the one or more processors to:

select the sparse simulation with the Clifford tracker from a plurality of supported simulation protocols for simulating the quantum circuit, wherein the selection is based on:

a number of non-Clifford gates included in the quantum circuit to be simulated; and a number of overall qubits in the quantum circuit to be simulated.

* * * * *